US012626090B2

(12) United States Patent
Margarit Taulé et al.

(10) Patent No.: US 12,626,090 B2
(45) Date of Patent: May 12, 2026

(54) HIERARCHICAL NEUROMORPHIC SENSOR ARRAY WITH INTEGRATED LEARNING FOR PHYSICOCHEMICAL PROPERTY PREDICTION

(71) Applicants: UNIVERSITÄT ZÜRICH, Zürich (CH); CONSEJO SUPERIOR DE INVESTIGACIONES CIENTÍFICAS, Madrid (ES)

(72) Inventors: Josep Maria Margarit Taulé, Igualada (ES); Shih-Chii Liu, Zurich (CH); Cecilia Jiménez Jorquera, Cerdanyola del Vallès (ES)

(73) Assignees: UNIVERSITÄT ZÜRICH, Zürich (CH); CONSEJO SUPERIOR DE INVESTIGACIONES CIENTÍFICAS, Madrid (ES)

( * ) Notice: Subject to any disclaimer, the term of this patent is extended or adjusted under 35 U.S.C. 154(b) by 948 days.

(21) Appl. No.: 17/798,038

(22) PCT Filed: Jan. 21, 2021

(86) PCT No.: PCT/IB2021/050454
§ 371 (c)(1),
(2) Date: Aug. 5, 2022

(87) PCT Pub. No.: WO2021/156693
PCT Pub. Date: Aug. 12, 2021

(65) Prior Publication Data
US 2023/0116496 A1 Apr. 13, 2023

(30) Foreign Application Priority Data
Feb. 6, 2020 (EP) ..................................... 20155987

(51) Int. Cl.
*G06N 3/04* (2023.01)

(52) U.S. Cl.
CPC ..................................... *G06N 3/04* (2013.01)

(58) Field of Classification Search
None
See application file for complete search history.

(56) References Cited

U.S. PATENT DOCUMENTS 11,138,501 B2 10/2021 Abel et al.

FOREIGN PATENT DOCUMENTS

CA 2002681 A1 5/1991
CN 106203624 A 12/2016
(Continued)

OTHER PUBLICATIONS

Steil, Online reservoir adaptation by intrinsic plasticity for backpropagation-decorrelation and echo state learning; Neural Networks 20 (2007); pp. 353-364 (Year: 2007).*
Peng et al., Neuromorphic Photonic Integrated Circuits; IEEE Journal of Selected Topics in Quantum Electronics, vol. 24, No. 6, Nov./Dec. 2018; Total pp. 15 (Year: 2018).*
CN Office Action dated Jun. 14, 2025 as received in Application No. 202180012262.8.
(Continued)

*Primary Examiner* — Alan Chen
(74) *Attorney, Agent, or Firm* — Maschoff Brennan

(57) ABSTRACT
A modular artificial neural sensing system includes a hierarchical network of neural sensing units including a neuromimetic sensor array of artificial sensory synapses and sensory neurons for receiving physicochemical sensed signals and for outputting sensor output signals. An artificial neural network processor is adapted for processing the sensor output signals and includes processor neurons interconnected by processor synapses forming first connections and second connections. The processor outputs processor output signals. A first sensor interface feeds processed or unprocessed sensed signals into the processor. A second sensor interface receives output predicted signals from other neural sensing units and feeds processed or unprocessed output predicted signals into the processor. A signal decoder decodes the processor output signals and outputs decoder
(Continued)

output signals. An error feedback module receives the decoder output signals and teaching signals for generating error signals depending on a difference between teaching signals and decoder output signals.

15 Claims, 4 Drawing Sheets

(56) References Cited

FOREIGN PATENT DOCUMENTS

| | | | |
|---|---|---|---|
| CN | 108985447 | A | 12/2018 |
| CN | 110188868 | A | 8/2019 |

OTHER PUBLICATIONS

Steil, et al., "Online reservoir adaptation by intrinsic plasticity for backpropagation-decorrelation and echo state learning," Neural Networks, Elsevier Science Publishers, Barking, GB, vol. 20, Issue 5, pp. 353-364 (Jun. 5, 2007).

European Search Report dated Jul. 22, 2020 as received in Application No. 20 15 5987.

EP Office Action dated Jul. 1, 2024 in application 21701598.1.

Steil et al., "Online Reservoir Adaptation by Intrinsic Plasticity for Backpropagation-Decorrelation and Echo State Learning", Neural Networks, Elsevier Science Publishers, Jun. 5, 2007.

Notice of Refusal dated Dec. 23, 2025 as received in CN application No. 202180012262.8.

* cited by examiner

HIERARCHICAL NEUROMORPHIC SENSOR ARRAY WITH INTEGRATED LEARNING FOR PHYSICOCHEMICAL PROPERTY PREDICTION

TECHNICAL FIELD

The present invention relates to an artificial neural sensing unit for predicting dynamic physicochemical properties (i.e., dynamic properties which are physical and/or chemical). The invention equally relates to a modular and hierarchical artificial neural sensing system comprising a plurality of artificial neural sensing units. The invention also relates to a method of operating the artificial neural sensing unit.

BACKGROUND OF THE INVENTION

Virtual sensing uses the information available online from other sensor measurements to estimate a property of interest. This approach represents an attractive solution for providing data otherwise unfeasible to obtain due to either the inexistence of specific sensors or the high costs associated to manufacturing such technologies. Many existing virtual sensing solutions are based on software implementations of machine learning models, trained with big past empirical data collected from sensors, and running aside on high-speed clocked, synchronous computing devices. Most solutions decouple today multi-sensor measurement, artificial intelligence (AI) computation, and system memory, sequentially processing data and moving data at limited throughputs between the three blocks. This makes it difficult for such solutions to adapt to new operating conditions in real time. In addition, this limits both miniaturisation and energy autonomy to operate locally in remote and narrow sensing spots.

The above challenges in mind, the engineering field of adaptive control theory provides general principles for estimating complex dynamics online from sensor observations and continuous output feedback. Resembling the parallel processing architecture of biological brains, these principles can be applied not only to generate, but also to learn the dynamics with local plasticity rules on predictive networks of neurons and synapses. Embodiments of both parts can operate dynamically in continuous time (i.e., varying at any time instant) and can have adaptive memory. Significant theoretical, computational, and experimental studies in neuroscience endorse such models of multisensory cortical processing. By using more artificial neurons than inputs to the neural network, and by feeding back predictions generated from neuronal activity (i.e., instantaneous spike firing rate), the resulting recurrent networks are able to efficiently encode task dynamics as sparse representations in space and time. This strategy is deemed advantageous for saving energy, expanding storage capacity in associative memories, and representing signals explicitly. Sparse sensor coding typically makes neurons more selective to specific patterns of input in a way that facilitates hierarchical feature extraction of multi-sensor stimulus. Because sparsely coded signals are overrepresented in the number of neural units, they are also robust to environmental constraints, such as noise and reduced connectivity between neurons. Additionally, subtracting neural network model predictions allows curtailing power consumption by encoding only the unexpected component(s) of sensor information. In the following description, sparsely coded signals are understood to represent information by using a small number of strongly active neurons out of a large population at any time instant. In non-sparse coding, feature representation is distributed simultaneously over the neurons that constitute the network.

A publication entitled "Online reservoir adaptation by intrinsic plasticity for backpropagation—decorrelation and echo state learning", Jochen J. Steil, Neural Networks, Volume 20, Issue 3, April 2007, Pages 353-364, discloses a solution that uses a biologically motivated learning rule based on neural intrinsic plasticity to optimise reservoirs of analogue neurons.

However, the existing solutions still have many limitations, in particular concerning miniaturisation, energy consumption, calibration and scalability.

SUMMARY OF THE INVENTION

The objective of the present invention is thus to overcome at least some of the above limitations relating to sensing circuits.

According to a first aspect of the invention, there is provided a modular artificial neural sensing system as recited in claim 1. The respective neural sensing unit of the system integrates a physicochemical sensing (sub)network, i.e., a set of sensors, in an encoding-decoding network, i.e., coders, together with an error feedback module. The resulting neural sensing unit is an artificial, recurrent neural (super)network operating as a dynamical model for predicting new physicochemical signals of interest, in continuous time and in a common system carrier.

There is thus provided a modular, artificial neural sensing system comprising a hierarchical structure of the artificial neural sensing units.

The proposed artificial neural sensing unit (NSU) or the artificial neural sensing system provides at least some of the following advantages:

Miniaturisation: The sensors, coders, and error feedback module can be fabricated in the same technology (e.g. very-large-scale integration (VLSI) integrated circuit (IC) process), and they can share a common system carrier (e.g. chip carrier package).

Privacy: Multi-sensor data can be featurised in situ, and abstracted from the initial raw information of the sensors (i.e., the encoder extracts features from the underlying structure learned from its input signals).

Low energy consumption: Predictive data coding in continuous time to avoid redundant information and computation cycles. As information is represented either in analogue or asynchronous-digital domains, signal processing and transmission are executed according to the dynamics of input signals and neural network, not at a fixed frequency provided by an external clock. Computation and memory can be distributed over the neurons and synapses that comprise the NSU.

Self-calibration: Integrated online learning to adapt to changing environmental contexts, and in an unsupervised way when teaching signals are absent. The NSUs are locally trained to facilitate convergence towards minimising a given prediction loss.

Scalability: Modular sensing and computation through hierarchical prediction of correlated physicochemical properties, thus scalable to fit the complexity of the system to model.

Computational power: Parallel, continuous-time and optionally nonlinear computation (i.e., through synaptic/neuronal filtering, analogue activation functions, or spike generation mechanisms in the neural network) to learn and predict complex patterns in real time.

Reliability: Embedded multi-sensor integration to increase consistency, accuracy, and functionality of the measurements in front of environmental effects, such as temperature, aging, and cross-sensitivity. Previous and current sensor values are sparsely represented in the dynamics of the neural network, which is robustly resistant to sensor noise and failure (i.e., prediction errors are less sensitive to factors such as noise and sensor failure).

According to a second aspect of the invention, there is provided a method of operating the neural sensing system as recited in claim 14. The method optionally comprises feeding decoder output signals into one or more other neural sensing units once the neural sensing unit has been trained.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

Figure 1:
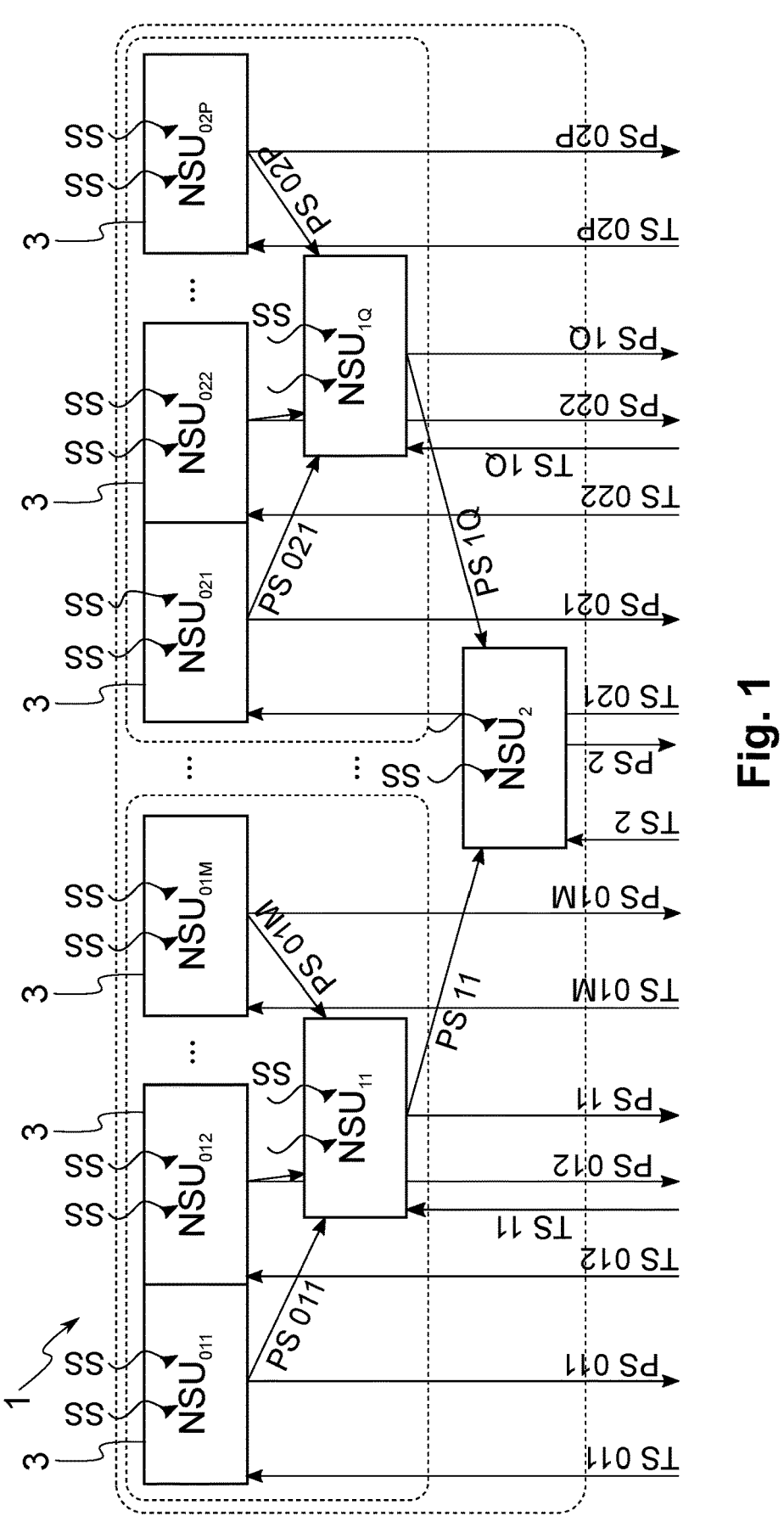
FIG. 1 is a block diagram illustrating an example artificial neural sensing system according to an embodiment of the present invention.

DETAILED DESCRIPTION OF AN
EMBODIMENT OF THE INVENTION

An embodiment of the present invention will now be described in detail with reference to the attached figures. This embodiment is described in the context of a hierarchical artificial neural sensing system for sensing dynamic physicochemical signals, but the teachings of the invention are not limited to this environment. Identical or corresponding functional and structural elements which appear in different drawings are assigned the same reference numerals. It is to be noted that the use of words "first" and "second" may not imply any kind of particular order or hierarchy unless such order or hierarchy is explicitly or implicitly made clear in the context.

FIG. 1 illustrates a hierarchical artificial neural sensing network or system 1 according to an example of the present invention. As can be seen, the system is composed of layers of artificial neural sensing units (NSUs) 3, whose structure is better shown in FIG. 2, and which form a hierarchical structure of interconnected NSUs. The system of FIG. 1 shows a dedicated, compact, and modular system architecture, configurable to different sensors and in distinct scenarios, and conceived to address critical limitations of portability (local computation and low power consumption), robustness (sparse feature coding), self-calibration (online learning), and scalability (extension to measurements of higher complexity). The system of FIG. 1 is thus composed of multiple miniaturised NSUs interconnected as composite sensors shown in FIG. 1 as dashed boxes. In the figures, the following abbreviations are used: SS stands for a sensed signal, TS stands for a teaching signal, and PS stands for a predicted signal. These signals are better understood with reference to FIG. 1 as explained below.

Figure 2:
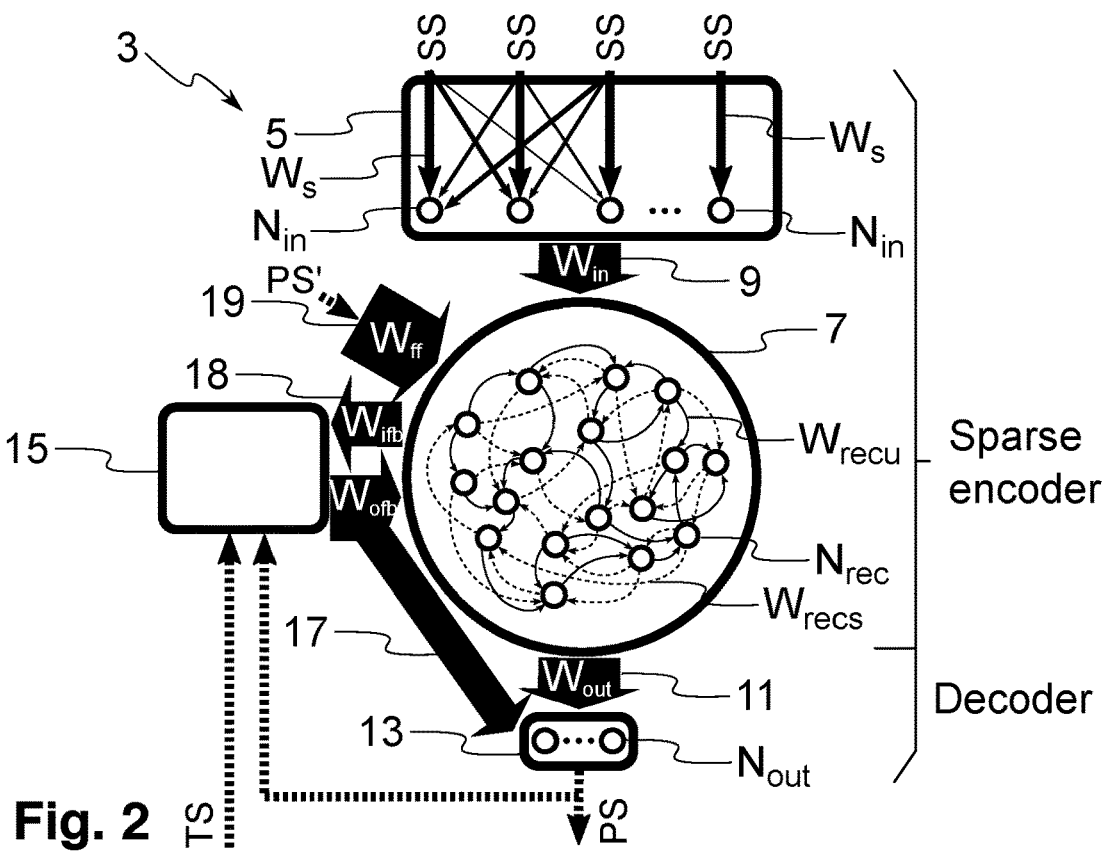
FIG. 2 is a schematic illustration of an example artificial sensing unit that can be used to build the system of FIG. 1.

Turning now to FIG. 2, it illustrates an example NSU 3 comprising multivariate physicochemical sensing, input-signal encoding-decoding, and error feedback to operate as an artificial, recurrent neural network (RNN) for physicochemical signal prediction. Thus, the NSU 3 performs as a neural network comprising two types of dynamical (i.e., time-varying and mathematically describable) parts: multiple-input, single-output integrator neurons N, connected by single-input, single-output integrator synapses W, where the synapses have a direction associated with them. All the neurons and synapses in the system are considered to integrate their inputs obeying dynamic equations (e.g. they act as leaky integrate-and-fire neurons or leaky integrator synapses). Thus, in the present description, the synapses and neurons are configured to process their input signals to generate output signals. Accordingly, when a signal passes through synapses and/or neurons, the resulting output signal may be considered to be a processed input signal. However, the verb "process" is to be understood broadly in the present description. In other words, the meaning of this word is understood to encompass any kind of operation applied to a signal. The neurons may transmit their outputs in the digital domain by performing analogue-to-digital conversion through a digital, spike firing generator (i.e. asynchronous pulse modulator), or in the analogue domain by an analogue activation function representing their instantaneous firing rate. The choice between the analogue and digital output signals depends on whether or not analogue-to-digital conversion is to be performed in the neurons. In this example, the NSU 3 comprises a neuromimetic sensor array 5 (i.e., an array configured to mimic the functioning or operation of (artificial) neurons), which is a sensing network or a set of K sensors performing as a first neural sensory stage of sensory synapses $W_s$ and sensory neurons $N_{in}$. The sensors are sensitive to input physicochemical properties of the environment, and transduce them to secondary neural signals, which are processable at succeeding computational stages of the NSU 3, according to the fixed dynamical models of synapses $W_s$ and neurons $N_{in}$. Each sensor may be, to a certain extent, selective to a given physicochemical parameter, but may also present some degree of cross-response to other properties sensed in the matrix. For example, a first sensor may be the most sensitive to ion A concentration in a liquid to be sensed, while a second sensor may be the most sensitive to ion B concentration in the liquid, a third sensor may be the most sensitive to molecule A concentration in the liquid and an Nth sensor may be most sensitive to only the temperature of the liquid. At the same time, the first sensor may also be somewhat sensitive to the other physicochemical parameters in the liquid and, in particular, to the ion B concentration and the molecule A concentration, while the second sensor may also be somewhat sensitive to the ion A concentration and the molecule A concentration, and the third sensor may also be somewhat sensitive to the ion A and B concentrations. In FIG. 2, the thickness of the arrows is directly proportional to the transduction gain of a given sensor to a given physicochemical input sensor signal. The sensors are arranged to take measurements or sense the environment at a relatively wider input SS frequency range (i.e. input signals faster and/or available for longer periods) than PS, the output signals to predict.

In the example of FIG. 2, the outputs of the sensor array and the predicted output signals from preceding NSU layers are linked to a dynamical, artificial neural network processor 7, which in this example is a fully recurrent neural network, or simply a reservoir, through multi-sensor interface stages 9 and 19, or simply sensor interfaces. The sensor interfaces are layers of artificial synapses to pass internally- and externally-generated multi-sensor signals to the reservoir 7. The connections in the sensor interfaces, and which are formed by the synapses, are in the following referred to as $W_{in}$ (transferring forward-propagated signals from sensed signals) and $W_{ff}$ (transferring predicted sensor signals from other NSUs). The reservoir 7 is in this example a subcircuit of the sparse neural encoder, with recurrently connected artificial neurons, also referred to as artificial neural network processor neurons $N_{rec}$, connected or linked by artificial synapses forming synaptic connections. As will be explained later in more detail, these synaptic connections can be divided into first connections, namely connections that are trained in an unsupervised manner, referred to as unsupervisedly trained connections $W_{recu}$, and indicated by solid lines in FIG. 2, and second connections, namely connections that are trained in a supervised manner, referred to as supervisedly trained connections $W_{recs}$, and indicated by dashed lines in FIG. 2.

The output signals from the reservoir 7 are configured to be fed forward into a signal decoder, which in this example comprises a decoder synaptic layer 11 and a decoder neuronal layer 13. More specifically, the decoder synaptic layer is in this example composed of synapses forming decoder synaptic connections $W_{out}$, while the decoder neuronal layer 13 is in this example composed of decoder neurons $N_{out}$ operating as read-out units for the reservoir 7. Both decoder synaptic and neuronal layers 11, 13 can thus be considered to jointly read out the outputs of the reservoir 7. The synapses of the decoder synaptic layer 11 interconnect the recurrently connected neurons $N_{rec}$ of the reservoir 7 to the decoder neurons $N_{out}$. Each neuron in the decoder is configured to output one decoder output signal. In this example, the decoder comprises L neurons $N_{out}$. Thus, various output signals (in this example L signals) may be generated simultaneously. The output of the decoder thus also forms the output of the NSU 3. It is to be noted that the decoder could instead be a feedforward network comprising multiple successive layers of synapses and neurons.

The NSU of FIG. 2 also comprises an error feedback module 15, which in this example has two inputs, namely a first input and a second input. The first input is configured to receive teaching signals TSs of typically lower average frequency than the average frequency of the SS and/or PS' input signals. The second input is configured to receive the decoder output signals, also referred to as output predicted signals PSs. The error feedback module is configured to determine the difference between a given training signal TS and a given decoder output signal or predicted signal PS, and to output an error feedback module output signal, also referred to as an error signal, which is thus understood to be an error-backpropagating neuromodulatory signal, which is configured to be fed back through a first error feedback module interface 17 to the reservoir 7 and the decoder 13. The error feedback module output signal is thus indicative of the contributions of each neuron to the prediction error in a respective decoder output signal relative to a respective training signal. There is also provided a second error feedback module interface 18 for conveying or transferring information, such as activity from the fully recurrent network in the reservoir 7 into the error feedback module. The first and second error feedback module interfaces 17, 18 are also synaptic layers composed of a set of synapses. The connections in the first and second error feedback module interfaces, and which are formed by the synapses of the first and second error feedback module interfaces, are in the following referred to as $W_{ofb}$ and $W_{ifb}$, respectively. Thus, the synaptic layers 9, 17, 18 and 19 are in this example all substantially identical in terms of structure, i.e., they are one-layer artificial synapses. However, at least the interfaces 9, 19 could instead be feedforward networks composed of multiple successive layers of synapses and neurons. The number of synapses in any given synaptic layer may not be the same as the number of required synapses depends on the number of neurons interconnected by a respective synaptic layer.

The operation and the structure of the NSU 3 is next explained in more detail. Each NSU 3 in the system 1 integrates dynamical neural models of physicochemical sensing and coding to simultaneously execute: (i) sparse multi-sensor spatiotemporal encoding of PS' and SS signals, (ii) signal decoding to estimate or predict other dynamic signals of interest, and (iii) error feedback to drive network and learning according to the teaching signals. The NSU operates as a dynamical system composed of the neurons N and the synapses W. Sparse multi-sensor encoding is performed in the neural network by the set of neurons $N_{in}$, $N_{rec}$ connected to SS signals and between them by means of the feedforward $W_s$, $W_{in}$, $W_{ff}$ and recurrent $W_{recu}$, $W_{recs}$ synapses. Sparsity is induced by lateral inhibition (local competition) between $N_{rec}$ coding neurons. The sparse activity of the reservoir is decoded by the readout neurons $N_{out}$ and synapses $W_{out}$. The dynamical models of N and W can be adapted by using local plasticity rules to learn their corresponding parameters (e.g. weights in W learned combining homosynaptic Hebbian and heterosynaptic non-Hebbian rules, which could be gated by the error). More specifically, during learning, the adaptive parameters of synapses and neurons are updated locally according to mathematical equations which only use variables available in the neurons (e.g., integrated variables equivalent to postsynaptic currents or membrane potentials in biological neurons, pre- and post-synaptic traces, prediction error, etc). Any of the synapses $W_{in}$, $W_{ff}$, $W_{recu}$ of the neural network encoding stage can be learned in an unsupervised way, with no need of prediction error feedback. The synapses $W_{recs}$, $W_{out}$ and the neurons $N_{out}$ of the decoding stage can be learned in a supervised way, with plasticity modulated by the prediction error. The neurons $N_{rec}$ could be learned in a supervised or unsupervised way. By unsupervised learning is understood in the present description a training which updates the parameters to learn independently from prediction error signals, using only the signals received from the internal multi-sensor interface 9 (also referred to as a first sensor interface), the external multi-sensor interface 19 (also referred to as a second sensor interface), and/or other information locally available in the neurons. The supervised training is distinguished from the unsupervised training in that, according to the supervised training, at least the error signals are used in the training. Thus, the supervised and unsupervised learning refer to the signals employed in the local learning rules/ equations defined in the neurons. In this sense, all those synaptic or neuronal parameters that are learned in an unsupervised way are updated as described by the learning rules and without using the signals transferred through $W_{ofb}$, even if they are locally available, because they do not appear in these rules.

The error signals backpropagating the prediction error between the decoded and teaching signals are also generated in the NSU and fed back through the preconfigured synaptic connections $W_{ofb}$ in order to adjust the plasticity of learnable parameters and to drive the dynamics of the neural network towards maximising similarity in time. All NSU operations are performed in continuous time to avoid the need for external clock signalling and to adapt computational activity to system dynamics. To facilitate the physical integration of the NSUs, all learning rules only depend on signals locally available to each neuron of the NSU. Except the sensed signals SS, all NSU input and output signals (i.e. TS, PS' and PS signals) are transmitted in the digital domain as asynchronous pulse-modulated signals (i.e. spike trains) to increase noise immunity. Internal NSU signals can be represented as either digital spike trains or analogue signals.

Once trained, every NSU can operate as a virtual sensor to estimate a given property of interest. This property would otherwise be unfeasible to measure due to either (i) the nonexistence of specific sensors for sensing it directly, or (ii) the high costs associated to manufacture such technologies. After training, each of the generated neural sensor measurements (i.e., the decoded PS output signals) can be reused as NSU input signals (for other NSUs) in order to estimate other useful signals. This is one of the advantages of having the hierarchical system: a modular prediction of signals interrelated by the input-output links modelled in every NSU 3, keeping the learning local and easily implementable in a physical substrate. For instance, in an embodiment turbidity may be predicted from oxide-reduction potential, conductivity, and a set of ionic concentrations, while concentration of $$NH_4^+$$

(ammonium) may be predicted from oxide-reduction potential, and another set of ionic concentrations, and odour intensity may be predicted from turbidity, $$NH_4^+,$$

and temperature. When using error-modulated neural network optimisation, providing such modulation locally from the teaching signal in each NSU avoids backpropagating the error signals beyond the NSU and between hierarchies, simplifying learning and prediction over the resulting deep neural sensor network.

The above-described NSU 3 structure is thus configured to fuse the signals SS and PS' into sparse spatiotemporal features, and the decoder output signal is predicted from these features by the readout neuronal layer of the decoder. The sparse encoder is formed by the elements of FIG. 2 except the decoder, the feedback error module 15, and the feedback interfaces 17 and 18. The sparse autoencoder is formed by the elements of the sparse encoder without the connections Wrens. By autoencoding is in this context understood encoding of the input in order to optimise its reconstruction. The present invention focuses on the case of NSU multivariate input signals of longer temporal exposure and/or higher average frequencies than the exposure and/or average frequency of the teaching signals TS. The additional temporal information (coming from the higher frequency ranges of SS and/or PS' signals) is exploited to learn an intermediate sparse representation in the reservoir 7 via fast $W_{in}$, $W_{ff}$ and $W_{recu}$ synapses. This unsupervisedly-learned representation is sparsely encoded to exhibit robustness in front of noise, sensor failure and reduced connectivity between the neurons. The resulting reservoir 7 dynamics are further corrected via supervised learning and the control loops closed through $W_{ifb}$, $W_{ofb}$, and $W_{recs}$ so as to encode the dynamics of PS at higher time scales. Once trained, the decoder output signals (i.e., the NSU output signals) can be reused as input signals of other NSUs in order to estimate other signals of higher predictive complexity, constituting the modular composite sensors.

Figure 3:
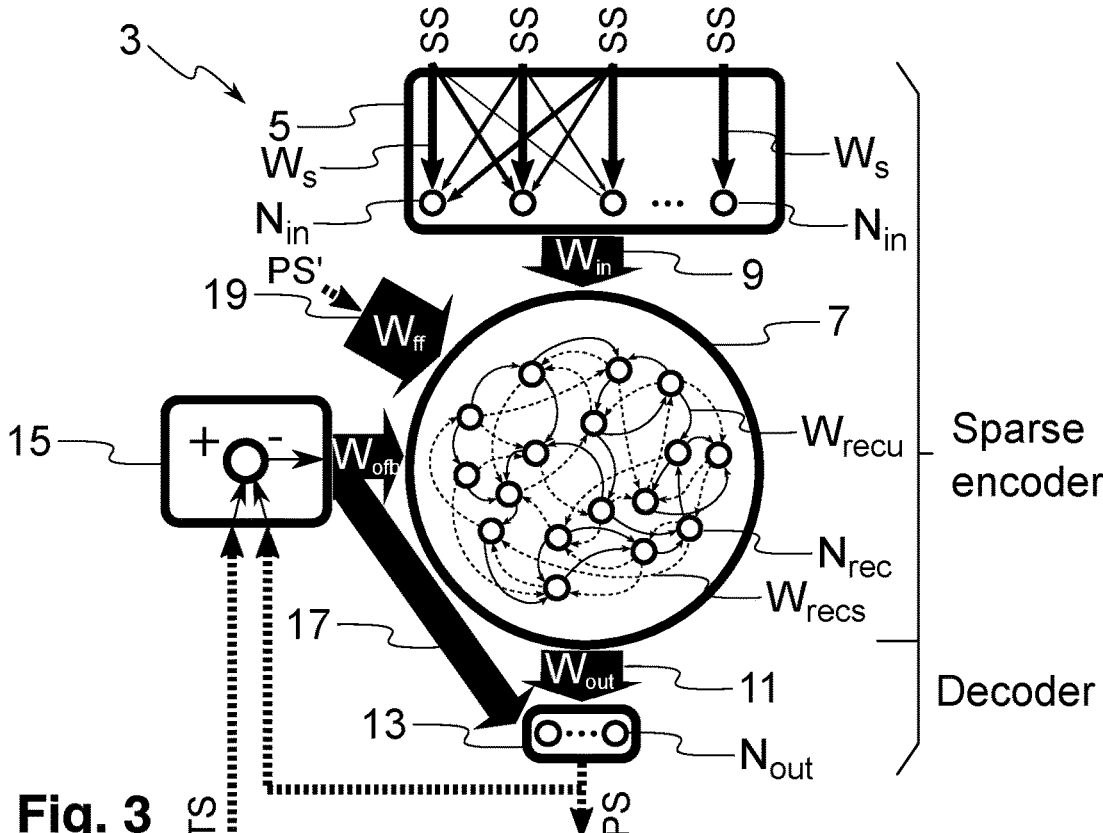
FIG. 3 illustrates a specific implementation of an error feedback module shown in FIG. 2.
Figure 4:
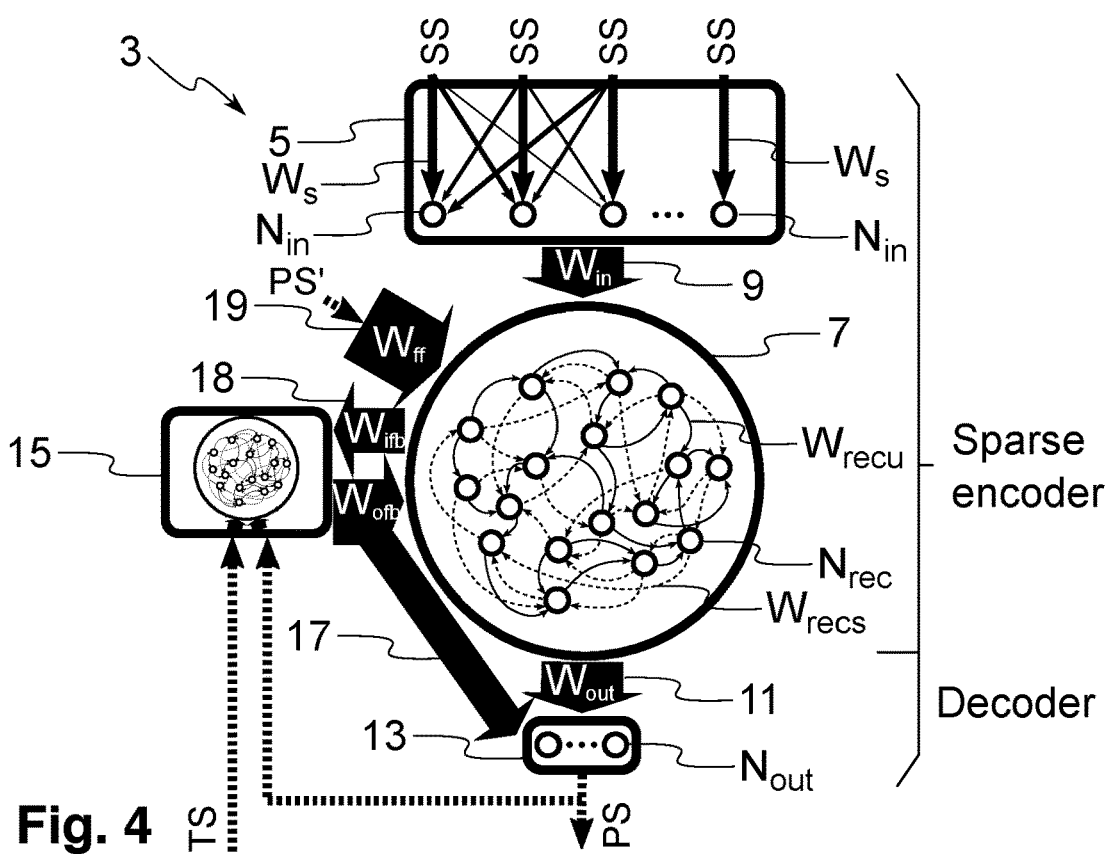
FIG. 4 illustrates another implementation of the error feedback module shown in FIG. 2.
Figure 5:
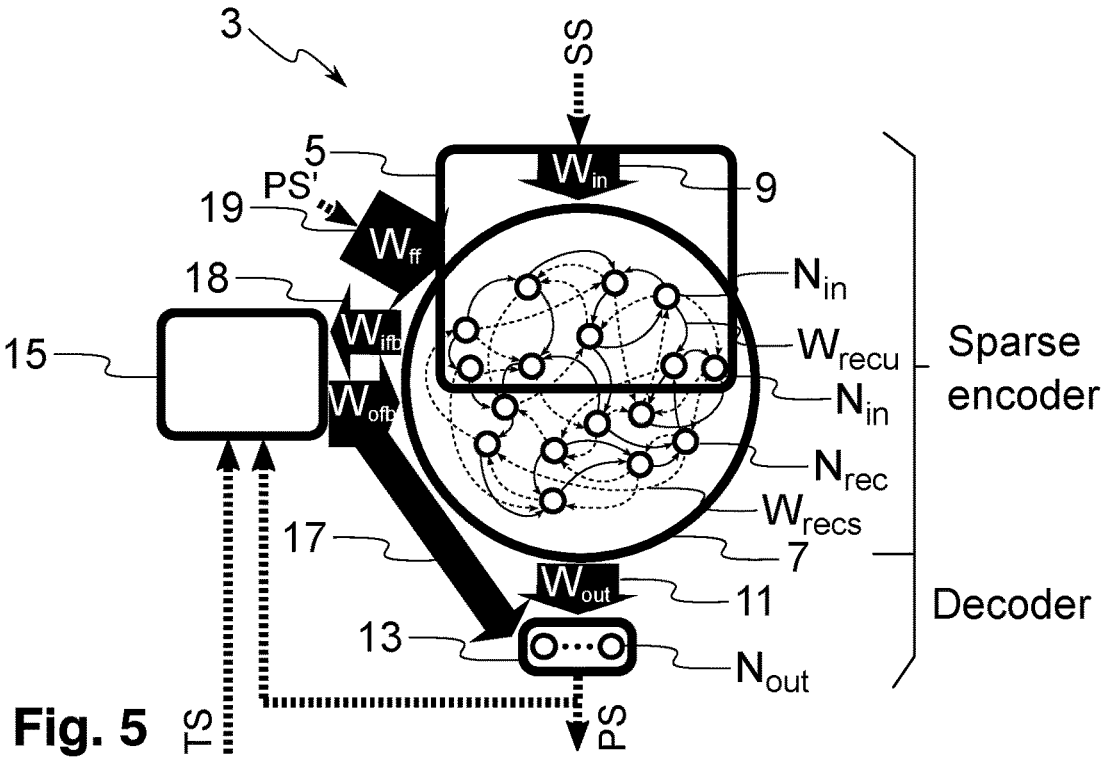
FIG. 5 illustrates a first variant of the artificial sensing unit.

FIG. 2, as explained above, shows a general implementation of the NSU 3. FIG. 3 shows an implementation in which the error feedback (i.e., the error signal) is provided from direct subtraction of the teaching and decoder output signals in the error feedback module 15. FIG. 4 depicts an implementation of the NSU 3 in which the error feedback is delivered through another preconfigured artificial neural network, which in this implementation is an RNN. FIG. 5 shows an implementation of the NSU 3 in which the sensor array itself is constituted by the synapses $W_{in}$, and the neurons $N_{in}$ as some of the neurons $N_{rec}$ of the reservoir 7. In this case, dynamical multi-sensor responses to the physicochemical signals SS are trained as opposed to being fixed. This can be implemented by learning the parameters of the connections $W_{in}$ leading to the reservoir 7, and/or the parameters of the neurons $N_{in}$ embedded as a subset of $N_{rec}$ in the reservoir 7. As can be seen in FIG. 5, in this variant of the invention the internal multi-sensor interface 9 is not placed between the sensors and the artificial reservoir 7, but is now a subcircuit of the neuromimetic sensor array.

Figure 6:
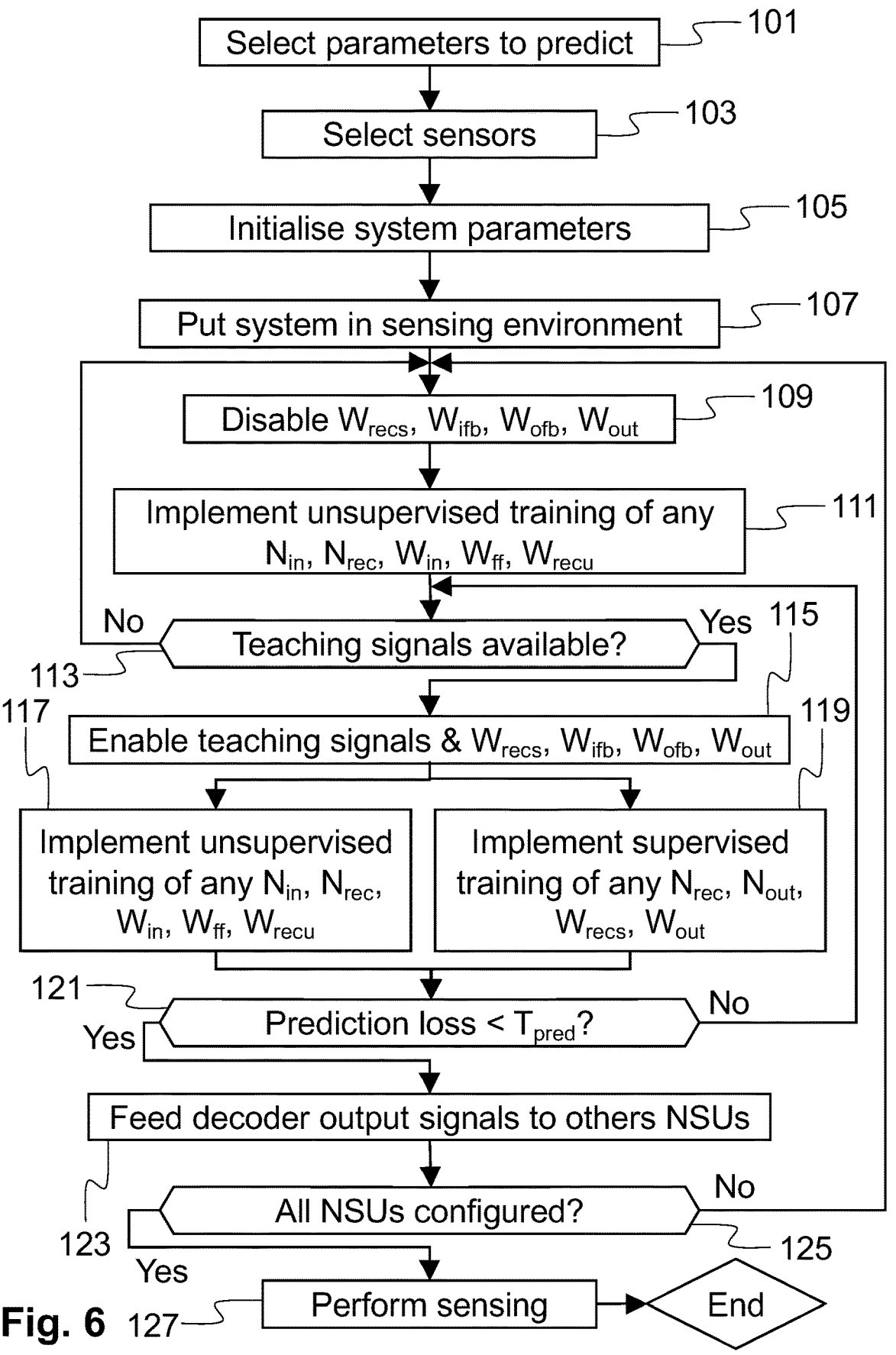
FIG. 6 is a flow chart illustrating a method of operating the artificial neural sensing system according to an example of the present invention.

The flow chart of FIG. 6 illustrates the operation of the system 1. In step 101, the user selects the parameters or properties to be predicted. In step 103, the system selects, based on the parameter selection, the sensors to be used in the subsequent sensing process. The NSU selection may instead or in addition be carried out by the user. Advantageously, the sensors, which are most sensitive to signals primarily correlated with the properties to predict, are selected. In step 105, the system initialises the error feedback module 15 and the remaining parameters of the system. This may e.g. involve initialising the synapses of the various artificial neural networks with pre-trained or random weights. If the error feedback module comprises an artificial neural network, then such network is also configured in this step. In step 107, the NSUs are placed to the sensing environment desired by the user.

A configuration phase of the NSU is next carried out in steps 109 to 121. In step 109, the system 1 initially deactivates supervised, error-driven operation by disabling $W_{recs}$ and the interfaces $W_{ifb}$, $W_{ofb}$, and $W_{out}$ (e.g. by gating all the related synapses with a '0' signal), and starts the unsupervised training (i.e., error-unmodulated training) in step 111 on any one of the neurons $N_{rec}$, and/or any one of the synapses $W_{in}$, $W_{ff}$, $W_{recu}$. If available (step 113), the system 1 selects the target output signals (i.e. the desired decoder output signals) to be included as teaching signals in step 115. SS and TS signals can be artificially generated from an existing database in a controlled environment, or they can be received online. A dedicated database advantageously exists in many practical applications of the invention (e.g. environmental monitoring, health assessment, industrial control). The target output signals may thus be provided by the user (e.g., obtained from measurements made by proprietary instrumentation) until the prediction loss as explained later goes below operational requirements. If not already done earlier (e.g., in step 105) the various NSUs are connected to each other in step 115. This same step activates supervised learning and error feedback by enabling $W_{rec}$ and the interfaces $W_{ifb}$, $W_{ofb}$, and $W_{out}$. The following training steps 117, 119 are in this example carried out in parallel. In step 117, the unsupervised training is carried out again on any one of the neurons $N_{in}$, $N_{rec}$, and/or the synapses $W_{in}$, $W_{ff}$, $W_{recu}$. In step 119, the supervised training (i.e., error-modulated training) is carried out on any one of the neurons $N_{rec}$, $N_{out}$, and/or the synapses $W_{recs}$, $W_{out}$. Therefore, the parameters of $N_{rec}$ can be learned either in a supervised or unsupervised way. Remarkably, and even though the error signal is only used in the supervised learning, now the neuronal activity is driven by the error feedback besides projections from other input signals. In step 121, the system determines whether or not the prediction loss is smaller than a threshold value $T_{pred}$. The prediction loss is calculated based on a given decoder output signal and a given teaching signal, e.g. by averaging the mean squared error between the two aforementioned signals. If it is determined that the prediction loss is not smaller than the threshold value, the system iterates over unsupervised and/or supervised training once again. In other words, the process continues in step 113. If, on the other hand, the prediction loss is equal to or smaller than the threshold value, then the process continues in step 123, where the decoder output signals are fed into one or more other NSUs once the present NSU has been trained. In step 125, it is determined whether or not all the NSUs 3 in the system 1 have been configured. In the affirmative, the process continues in step 127, where the configured and trained system is used to predictively sense one or more desired parameters of the environment in which the system operates. If in step 125 it was determined that not all the NSUs have been configured, then the process continues in step 109 to train the generation of TSs of higher hierarchies. The process comes to an end after step 127. It is to be noted that the sensing phase may be interrupted at any moment, for example if it is determined that the prediction loss is too high. In this case, the system may be trained again, and after this, the sensing phase may be resumed.

The above-described artificial neural sensing unit or NSU 3 can thus be summarised to comprise the following features or characteristics:

A first, neural network encoding stage is used to generate sparse signatures by modelling (i) the spatiotemporal relationships between the input signals, predicted by other NSUs (PS') or sensed by an integrated neuromimetic sensor array (SS), and (ii) the slower dynamics of the target output signals (TS).

A second readout (decoder) stage is used to predict properties of interest from the representation generated in the previous encoding stage.

An error feedback module is used to modulate learning in the encoder-decoder network from the prediction performance. More specifically, the error feedback module computes and distributes back error-based neuromodulatory learning signals from teaching signals, decoder output signals and/or fully-recurrent neuronal activity, so as to adapt the encoder-decoder network towards generating the desired output.

Input signal autoencoding can be learned by unsupervised local learning. Output dynamics encoding (i.e., through the neurons $N_{rec}$ and the synapses $W_{recs}$) and decoding (i.e., through the neurons Nous and the synapses $W_{out}$) may be learned by supervised local learning on the prediction error with respect to the target output signals.

Once trained, the NSU output signals are reused as input signals of other NSUs in order to estimate other signals of higher predictive complexity, constituting the modular composite sensors.

Therefore, according to one example, there is proposed a modular, general-purpose neural network sensor comprising one or more neural sensing units 3, a respective neural sensing unit comprising:

a neuromimetic sensor array 5 of artificial sensory synapses $W_s$, $W_{in}$, and sensory neurons $N_{in}$ as a subnetwork of a feature encoding network, for receiving physicochemical sensed signals SS correlated with other target attributes to predict, and for outputting a set of processed sensor output signals to generate such features;

an artificial neural network processor 7 for further encoding the sensor output signals, the artificial neural network processor 7 comprising artificial neural network processor neurons $N_{rec}$ interconnected by artificial processor synapses $W_{recu}$, $W_{recs}$ forming first connections $W_{recu}$ and different, second connections $W_{recs}$, the artificial neural network processor 7 being configured to output a set of artificial neural network processor output signals;

a first sensor interface 9 for feeding processed or unprocessed physicochemical sensed signals SS into the artificial neural network processor 7 of the respective neural sensing unit 3;

a second sensor interface 19 for receiving output predicted signals PS' from other neural sensing units 3, and for feeding processed or unprocessed output predicted signals PS' into the artificial neural network processor 7 of the respective neural sensing unit 3;

a signal decoder 11, 13 for decoding the artificial neural network processor output signals, and for outputting a set of decoder output signals PS which are the target attributes to predict; and an error-propagating feedback module 15 configured to receive the decoder output signals PS and teaching signals TS for generating a set of error signals fed back to be locally available in space and time to synapses W and neurons N, a respective error signal being indicative of the contributions of each dynamical part to a prediction error depending on a difference between a respective teaching signal TS and a respective decoder output signal PS, wherein the neural sensing units 3 are configured with the first connections $W_{recu}$ to be locally trained by at least any of the processed or unprocessed physicochemical sensed signals SS received from the respective first sensor interface 9 and/or any of the processed or unprocessed output predicted signals PS' received from the respective second sensor interface 19, and the second connections $W_{recs}$ of the neural sensing units are configured to be locally trained by at least any of the error signals, and wherein the neural sensing units 3 are hierarchically interconnected so that any of the decoder output signals PS from a given layer are configured to be fed at least into a second sensor interface of another neural sensing unit 3 of a subsequent, lower layer.

Furthermore, optionally, the synapses W of the neural sensing units 3 are a first-type dynamical part, and the neurons N of the neural sensing unit are a different, second-type dynamical part, instances of the first-type dynamical part being configured as single-input, single-output integrator synapses, and instances of the second-type dynamical part being configured as multiple-input, single-output integrator neurons, and wherein both processing and dynamic memory are physically distributed throughout the neurons and synapses of the respective neural sensing unit 3, forming a directed neural network that exhibits continuous-time dynamical behaviour.

The error feedback modules 15 may comprise an artificial neural network configured to generate the set of error signals, a respective error signal being indicative of the contributions of each dynamical part to a prediction error depending on a difference between a respective teaching signal TS and a respective decoder output signal PS.

The neural sensing units 3 may be configured with at least some of the artificial neural network processor neurons $N_{rec}$ comprising the set of sensory neurons $N_{in}$.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A modular artificial neural sensing system comprising a hierarchical network of neural sensing units, each neural sensing unit comprising:

a neuromimetic sensor array of artificial sensory synapses and sensory neurons, for receiving physicochemical sensed signals and for outputting a set of sensor output signals;

an artificial neural network processor for processing the sensor output signals, the artificial neural network processor comprising artificial neural network processor neurons interconnected by artificial processor synapses forming first connections and different, second connections, the artificial neural network processor being configured to output a set of artificial neural network processor output signals;

a first sensor interface for feeding processed or unprocessed physicochemical sensed signals into the artificial neural network processor of the respective neural sensing unit;

a second sensor interface for receiving output predicted signals from other neural sensing units, and for feeding processed or unprocessed output predicted signals into the artificial neural network processor of the respective neural sensing unit;

a signal decoder for decoding the artificial neural network processor output signals, and for outputting a set of decoder output signals, which are output signals to predict; and an error feedback module configured to receive the decoder output signals and teaching signals for generating a set of error signals configured to be fed back through a first error feedback module interface to the artificial neural network processor and the signal decoder, a respective error signal depending on a difference between a respective teaching signal and a respective decoder output signal, wherein:

the first connections of the respective neural sensing unit are configured to be locally trained by at least any of the processed or unprocessed physicochemical sensed signals received from the first sensor interface and/or any of the processed or unprocessed output predicted signals received from the second sensor interface, the second connections of the respective neural sensing unit are configured to be locally trained by at least any of the error signals, and the neural sensing units are interconnected so that any of the decoder output signals from a given layer are configured to be fed at least into a second sensor interface of another neural sensing unit of a subsequent, lower layer.

2. The neural sensing system according to claim 1, wherein:

the synapses of the neural sensing units are a first-type dynamical part, the neurons of the neural sensing units are a different, second-type dynamical part, instances of the first-type dynamical part being configured as single-input, single-output integrator synapses, and instances of the second-type dynamical part being configured as multiple-input, single-output integrator neurons, and the neurons and synapses of the neural sensing units form a directed neural network exhibiting continuous-time dynamical behaviour.

3. The neural sensing system according to claim 1, wherein:

the signal decoder comprises a set of artificial decoder neurons forming a set of signal read-out units, and a set of artificial decoder synapses forming third connections, and the artificial decoder synapses connect the artificial neural network processor to the artificial decoder neurons.

4. The neural sensing system according to claim 3, wherein the artificial decoder neurons and/or the third connections are configured to be trained by at least the error signals.

5. The neural sensing system according to claim 1, wherein:

the first connections are configured to be trained previously or simultaneously with the second connections, and at a separate time scale from the one at which learning of the second connections evolve, learning in the first connections is driven by the processed or unprocessed physicochemical sensed signals and the processed or unprocessed output predicted signals, and the physicochemical sensed signals and the output predicted signals have higher average frequencies than average frequencies of the teaching signals used to generate the error signals configured to modulate learning in the second connections.

6. The neural sensing system according to claim 1, wherein:

the artificial neural network processor neurons are configured to be trained by at least any of the signals employed for training the first connections, or any of the error signals, and wherein the error signals are generated using the teaching signals of lower average frequency than the average frequencies of the physicochemical sensed signals and/ or the output predicted signals.

7. The neural sensing system according to claim 1, wherein the artificial neural network processor is a subcircuit of a recurrent neural network.

8. The neural sensing system according to claim 1, wherein:

the error feedback module is connected to the artificial neural network processor by a second error feedback module interface, and the first and second error feedback module interfaces comprise artificial error feedback synapses.

9. The neural sensing system according to claim 1, wherein:

the first sensor interface comprises first artificial interface synapses, and the second sensor interface comprises second artificial interface synapses.

10. The neural sensing system according to claim 1, wherein the neural sensing units are configured to implement sparse coding of the physicochemical sensed signals and the output predicted signals by lateral inhibition between the artificial neural network processor neurons.

11. The neural sensing system according to claim 1, wherein the error feedback module comprises a subtractor unit configured to subtract a respective decoder output signal from a respective training signal, or vice versa.

12. The neural sensing system according to claim 1, wherein the error feedback module comprises an artificial neural network configured to generate the set of error signals.

13. The neural sensing system according to claim 1, wherein at least some of the artificial neural network processor neurons comprise the set of sensory neurons.

14. A method of operating the neural sensing system according to claim 1, wherein the method comprises:

selecting the teaching signals;

feeding the teaching signals into the error feedback module;

carrying out error-unmodulated training of at least the first connections by using at least any of the signals coming from the first sensor interface, and any of the signals coming from the second sensor interface; and carrying out error-modulated training of at least the second connections by using at least any of the error signals.

15. The method according to claim 14, wherein the method further comprises feeding the decoder output signals into one or more other neural sensing units once the respective neural sensing unit has been trained.

* * * * *